INVENTORS
OSAMU NAGATSUKA
MITSUTAKA KAWADA
BY
OSTROLENK, FABER, GERB & SOFFEN
ATTORNEYS

May 2, 1967 OSAMU NAGATSUKA ETAL 3,316,754
VISCOSITY DETECTOR
Filed June 30, 1964 3 Sheets-Sheet 3
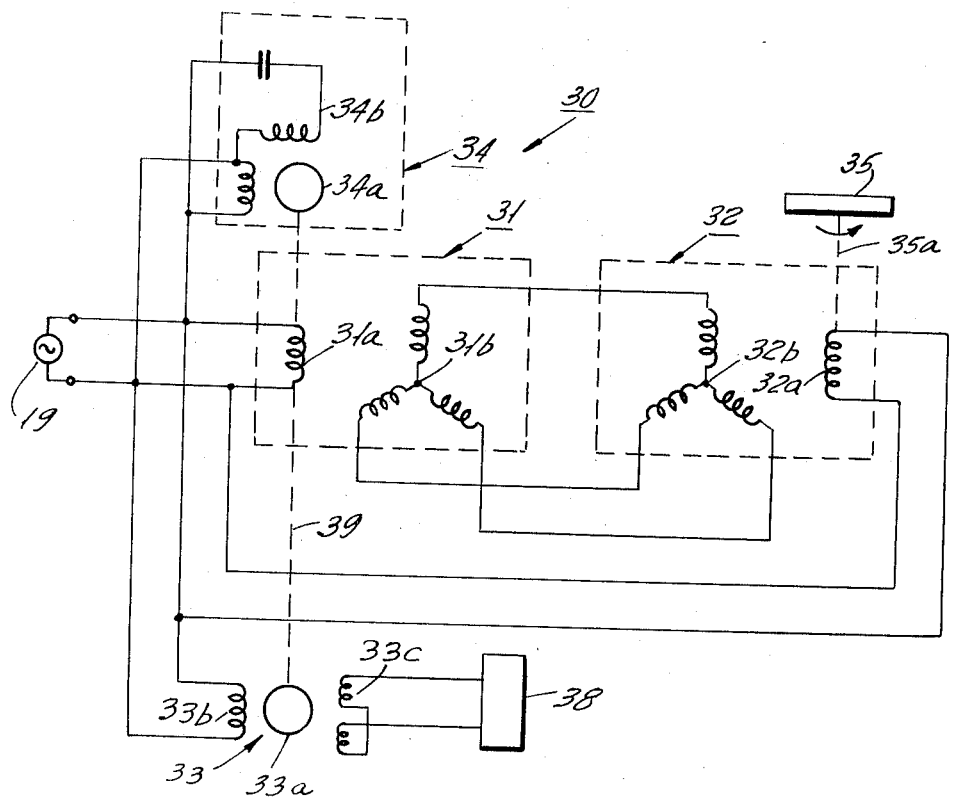
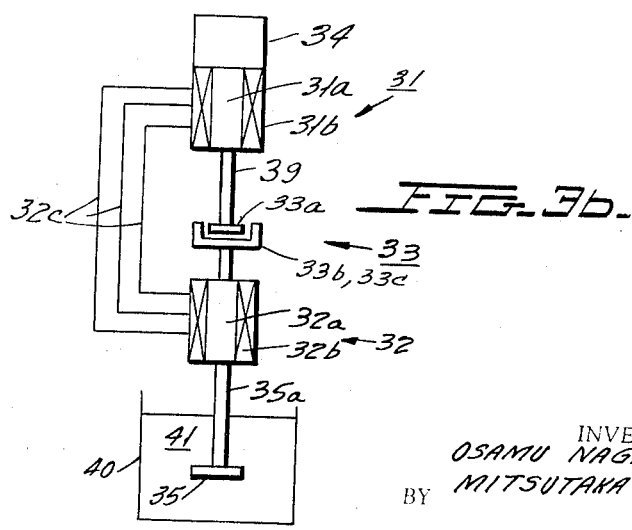
INVENTORS
OSAMU NAGATSUKA
MITSUTAKA KAWADA
BY
OSTROLENK, FABER, GERB & SOFFEN
ATTORNEYS

United States Patent Office 3,316,754
Patented May 2, 1967

3,316,754
VISCOSITY DETECTOR
Osamu Nagatsuka and Mitsutaka Kawada, Shiba Mita, Minatoku, Japan, assignors to Nippon Electric Company Limited, Tokyo, Japan
Filed June 30, 1964, Ser. No. 379,249
Claims priority, application Japan, July 3, 1963, 38/34,917
13 Claims. (Cl. 73—59)

The instant invention relates to instruments for measuring viscosity and more particularly to a viscosity detection instrument employing synchro receivers and transmitters capable of generating an output signal representative of viscosity and having a wide operating range, being able to provide continuous operation and being readily adaptable to transmit the signal representative of viscosity to a remote location.

Viscosity detectors and viscosity measurement means find widespread use in a variety of applications. Conventional means for detecting and measuring viscosity are of the capillary types, falling ball types and rotating types, to name just a few. All present day viscosity detection devices, however, are unsuitable for use as detectors in automation systems because of a lack of ability to provide continuous measurements, a lack of ability to provide an output signal suitable for transmission to the distant locations and further being unable to provide a suitable viscosity measurement over an extremely wide operating range.

The instant invention provides a viscosity measurement means employing synchro receiver and transmitter means which overcome all of the disadvantages of present day systems and which provide viscosity measurements over a wide range as well as providing a signal suitable for transmission to distant locations.

The instant invention is comprised of synchro receiving means mechanically linked with a rotating member such as a disc, cylinder or ball, wherein the synchro receiver means is electrically connected to synchro transmitter means which is mechanically coupled in such a manner as to be driven at any desired angular velocity. The synchro receiving means is electrically coupled so as to follow the rotation of the synchro transmitter means with a predetermined lag caused by the shearing stress or velocity of a fluid having a velocity gradient and in which the rotating member is immersed. The viscosity measurement is then detected as the angular difference between the synchro transmitter and the synchro receiver means. Continuous operation of the synchro transmitter means under control of a primary mover source permits continuous generation of a viscosity signal which is suitable for transmission to remote locations as well as being capable of operating controller means for adjusting the viscosity of the fluid being measured so as to provide a viscosity controller system.

It is therefore one object of the instant invention to provide novel means for detecting the viscosity of fluids and the like.

Another object of the instant invention is to provide a novel means for detecting the viscosity of fluids and the like and being comprised of a rotational member driven by synchro receiver means.

Another object of the instant invention is to provide novel means for viscosity detection of fluids and the like comprising synchro transmitter means driven at a predetermined velocity and synchro receiver means driving a rotating member electrically connected to said synchro transmitter means and developing a signal representative of the angular difference between the synchro transmitter and receiver means, which angular difference signal represents the viscosity of the fluid being measured.

These and other objects of the instant invention will become apparent when reading the accompanying description and drawings in which:

FIGURE 1b is a diagrammatic view showing the exterior view of the viscosity detection means of FIGURE 1a.

FIGURES 3a and 3b are schematic and diagrammatic views, respectively, showing still another embodiment of the viscosity detector means of the instant invention.

Figure 1A:
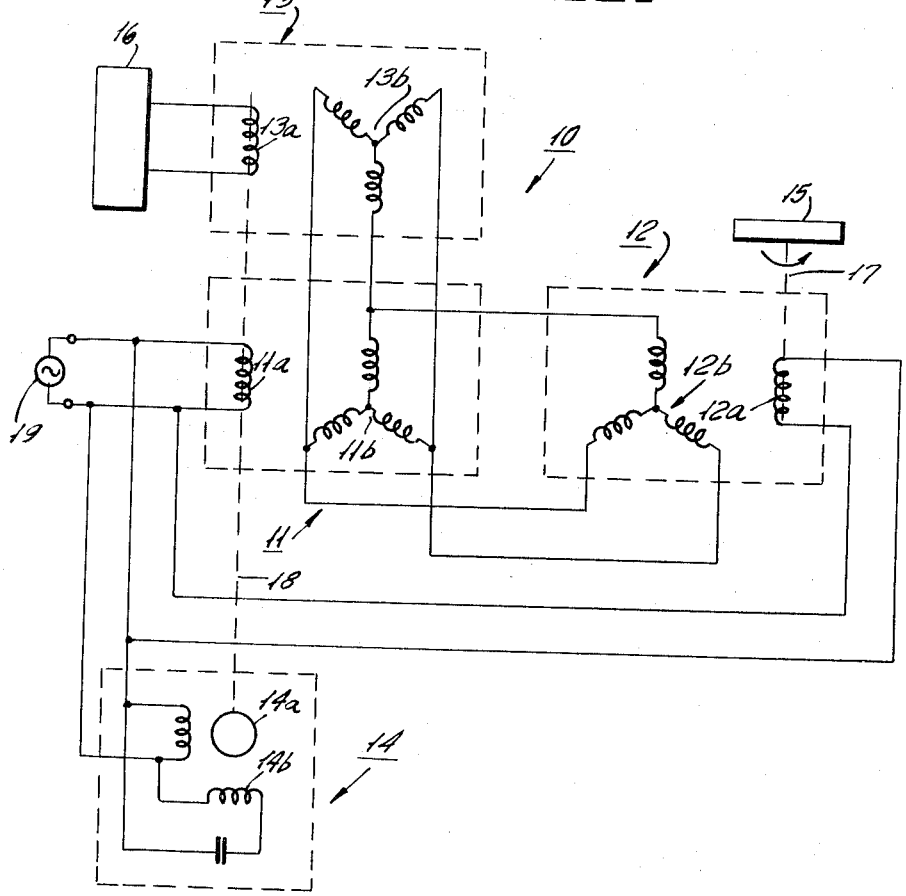
FIGURE 1a is a schematic diagram showing a viscosity detector designed in accordance with the principles of the instant invention.
Figure 1B:
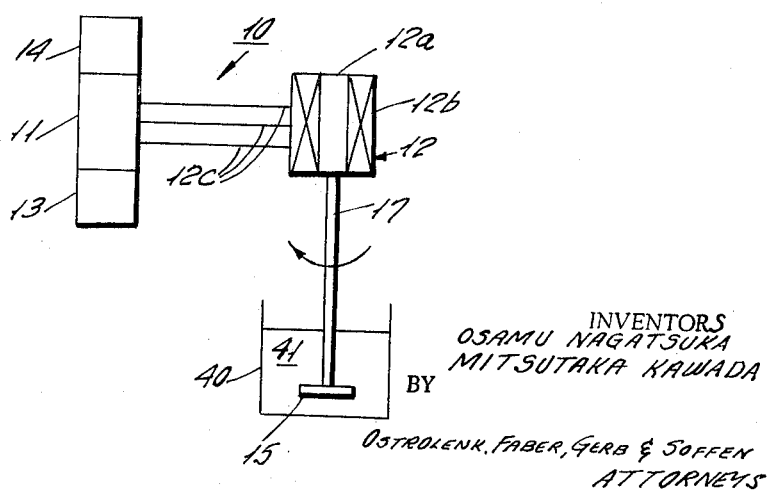

Referring now to the drawings and more particularly to FIGURES 1a and 1b, a viscosity detection means 10 is shown therein as being comprised of a synchro transmitter means 11 having an armature coil 11a and a field coil 11b. A synchro receiver means 12 has its field coil 12b electrically connected to the field coil 11b. The synchro receiver means 11 has its armature coil 12a mechanically coupled to a rotating member 15, the linkage being represented by the dashed line 17. The field coils 11b and 12b are connected in electrical parallel.

A synchro control transformer means 13 is also provided and has its field coils 13b connected in electrical parallel with the field coils 11b and 12b.

After suitably adjusting the electrical zero position of the armatures 11a and 12a of synchro transmitter and servo receiver means 11 and 12, respectively, the armature 13a is mechanically coupled to the armature 11a of synchro transmitter means 11 and further is mechanically coupled to the armature 14a of synchronous motor 14. This mechanical linkage is represented by the dashed line 18.

The rotating member 15, to which the armature coil 12a is connected, may be any suitable rotating member such as, for example, a circular disc, a spherical member, or a fan blade structure.

A power source 19 which may be a commercial power line or a power source from any suitable oscillator means (not shown) is connected across the field coils 14b of synchronous motor 14, as well as being connected to the armature coils 11a and 12a which are all connected in electrical parallel to the power source 19. If the synchro transmitter armature coil 11a and the control transformer armature coil 13a, both of which are mechanically connected to the synchronous motor armature, are driven at a fixed angular velocity by the synchronous motor means 14, then an electric current will flow in the field coils 11b and 12b in proportion to the relative angular difference of the armatures 11a and 12a of the transmitter and receiver means, respectively. This current generates a rotational torque causing the receiver means armature 12a to follow the angular velocity of the transmitter means armature 11a. The rotating member, or disc 15, which is mechanically connected through means 17 to armature 12a and which is immersed in a fluid 41 contained in a vessel 40, it is thereby caused to rotate about its longitudinal axis in the fluid medium 41 as shown by arrow 42, for example.

Assuming the shearing stress (the viscosity) to be constant when a constant velocity gradient is imposed upon the fluid medium having a fixed velocity, then there will be a constant relative angular difference between rotation of the armature coils 11a and 12a which is in proportion to the shearing stress, thereby resulting in a current flow which is proportional to the relative angular difference in the three parallel connected field coils 11b, 12b and 13b, with this current flow inducing a voltage across the armature coil 13a of the synchro control transformer 13 proportional to the current flow (i.e., the said relative angular difference). If the viscosity changes, the relative angular difference will also change and hence the voltage across the armature coil 13a of the control transformer 13 will change. By comparing this voltage with a calibrated viscosity, any viscosity of an ordinary fluid may be measured in a continuous manner. By connecting the armature 13a to a controller means 16, an automatic control of the viscosity may be accomplished. For example, the controller means 16 may be coupled to the liquid source to add liquid of a lower or higher density as the case may be in order to obtain a specific viscosity reading. As another possibility, the controller means 16 may operate a temperature regulation means to control the temperature of the liquid which, in turn, also has an effect upon the viscosity of the fluid.

In cases where viscosity readings over an extremely wide range are desirable, they may be easily obtained simply by changing the angular velocity at which the armature 14a of synchronous motor 14 operates. Viscosities of any Newtonian fluid, or non-Newtonian fluid may be measured with the apparatus of FIGURES 1a and 1b since the angular velocity is kept constant during the measurement operation.

FIGURE 1b shows a diagrammatic view of the viscosity detection means 10 wherein the exterior view of the rotational part of the system is shown as being comprised of the rotating member or disc 15 coupled through mechanical means such as shaft 17 to the armature 12a of synchro receiver means 12. The electrical connections of the field coils 12b to the field coils of the synchro transmitter means 11 are represented by the lines 12c. The disc 15 is shown immersed in the fluid 41 contained in vessel 40.

Figure 2A:
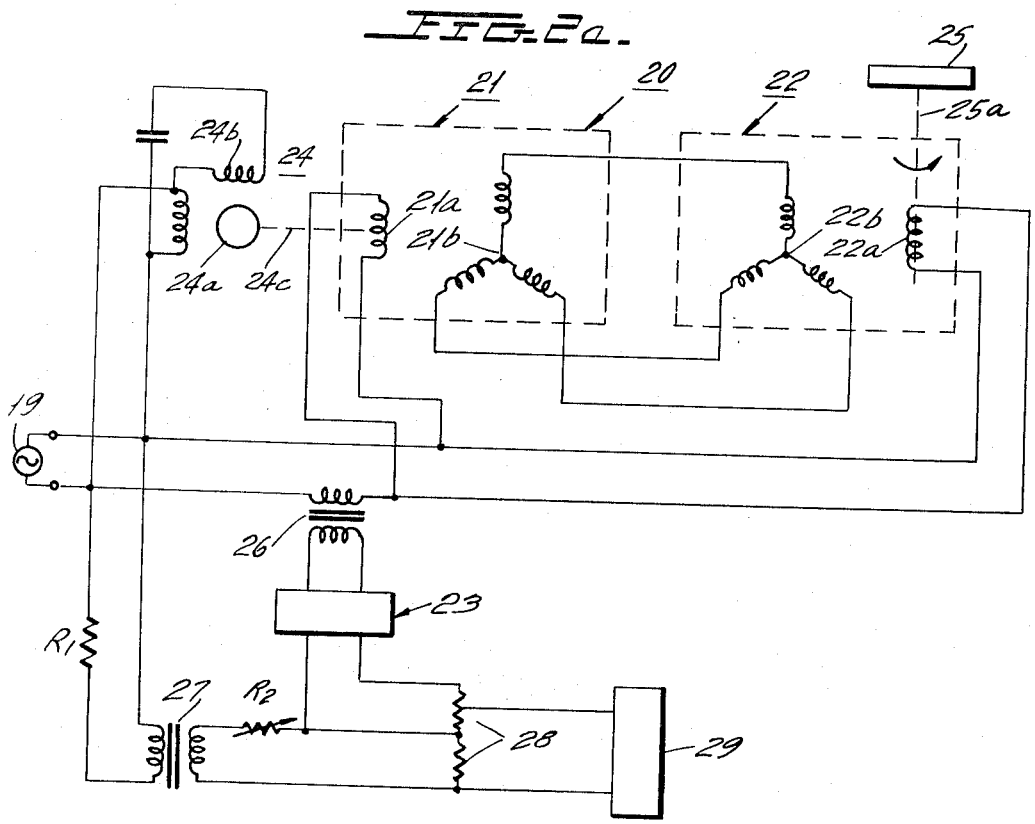
FIGURES 2a and 2b show a schematic diagram and a diagrammatic view of another embodiment of the instant invention.
Figure 2B:
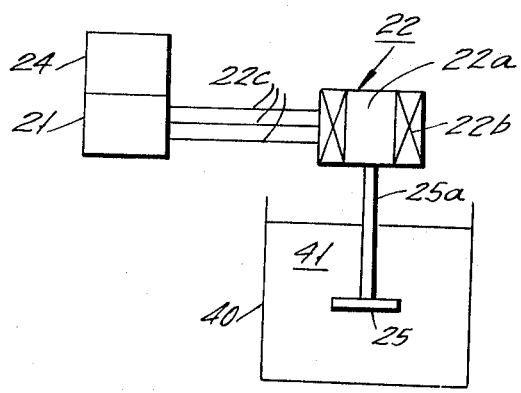

While a synchro control transformer means 13 of FIGURE 1a is employed as a converter for developing a signal representative of the relative angular difference between armatures 11a and 12a, the viscosity may also be measured by converting the relative angular viscosities between the synchro transmitter and synchro receiver means into the armature current representative of this angular velocity difference. This embodiment is shown in FIGURES 2a and 2b. In the viscosity detector 20 of FIGURES 2a and 2b the field coils 21b and 22b of the synchro transmitter and synchro receiver means 21 and 22, respectively, are connected in electrical parallel. The armature coils 21a and 22a are also connected in electrical parallel so as to be energized by a power source 19. The power source also applies power through the primary winding of a current transformer means 26 which has its secondary connected to a phase corrector means 23. The output of the phase corrector means is connected across one-half of load resistor means 28. A compensator circuit comprised of a dummy resistor $R_2$ is connected in series with the primary winding of a second current transformer 27 which has an identical voltage-current characteristic relative to the first current transformer 26. Power source 19 energizes resistance $R_2$ and current transformer 27. A synchronous motor 24 has its field coils 24b connected across power source 19 and has its armature 24a mechanically coupled through the linkage 24c to the armature coil 21a of synchro transmitter means 21. The armature coil 22a of the receiver synchro means 22 is mechanically coupled to the rotating member 25 through the linkage designated 25a.

If the phase corrected current at the output of phase correction means 23 and a current generated by the secondary of current transformer 27 are wired in either an in-phase or in an opposite-phase relationship, a voltage of the sum or difference therebetween of these two currents across the load resistor 28 will then be generated.

The rotating member 25, coupled to the armature 22a of synchro receiver means 22, is immersed in a fluid 41 contained in vessel 40 and is rotated by armature coil 22a.

The armature 24a of synchronous motor 24 rotates at a constant angular velocity under control of power source 19, which rotation is imparted to the armature coil 21a of transmitter synchro 21, which also rotates at a fixed angular velocity. The receiver armature 22a will follow the rotation of transmitter armature 21a with a relative angular difference which is proportional to the viscosity of the fluid 41. The armature currents of the synchro transmitter and receiver 21 and 22, respectively, will thereby be proportional to the relative angular difference therebetween with this resultant or difference in current being impressed upon the primary of current transformer 26. The in-phase or opposite-phase relationship is measured across the load resistor 28 which develops a voltage drop proportional to the viscosity of the fluid medium 41.

The viscosity of the fluid may be automatically controlled by connecting the output of load resistor 28 to a controller means 29 which may operate in a manner similar to the controller means 16 of FIGURE 1a. The electrical zero position of the viscosity detector means 20 may be normalized at any arbitrary point through means of a biasing current, the value of which is controlled by varying the value of adjustable resistance means $R_2$.

FIGURE 2b shows diagrammatically the physical arrangement of the viscosity detector 20 wherein the rotating disc 25 is coupled through a shaft 25a to the synchro receiver armature coil 22a. The electrical connections of the field coil 22b to the field coil of synchro transmitter 21 is represented by the lines 22c.

Whereas the synchro transmitter and receiver means of the embodiments of FIGURES 1 and 2 are structurally separate and independent, it is also possible to design the viscosity detector means in such a manner as to structurally connect the synchronous motor, synchronous transmitter and synchronous receiver and the differential transformer means and rotating member to a single shaft as is the case with the embodiment of FIGURES 3a and 3b. Considering first the electrical structure, FIGURE 3a shows a schematic of the viscosity detector means 30 as being comprised of a synchro transmitter and receiver 31 and 32, respectively. The field coils 31b and 32b are connected in electrical parallel in the same manner as previously described. The armature coil 32a of synchro receiver 32 is mechanically coupled to the rotating member or disc 35 by a suitable shaft 35a. The synchronous motor means 34 has its field coils 34b connected across power source 19 and has its armature 34a mechanically coupled to the armature coil 31a of synchro transmitter 31. Armature coils 31a and 32a are connected across power source 19 and are also connected in electrical parallel with the primary winding 33b of a differential transformer means 33. The secondary winding 33c is connected to a controller means 38 while the armature 33a of the differential transformer means 33 is mechanically coupled to the armature 34a of synchronous motor 34 by means of the mechanical linkage 39, which linkage also couples armature 31a to armature 34a. The armature 32a of the synchro receiver 32 is mechanically coupled to the fields (33b, 33c) of differential transformer means 33 and to the rotating member of the disc 35 through a suitable shaft 35a (the field and armature in corresponding electrical positions).

As shown in FIGURE 3b, the rotating member or disc 35 is immersed in a fluid medium 41 contained in vessel 40. The power source 19 causes the armature 34a of synchronous motor 34 to rotate at a constant angular velocity which imparts a rotation to synchro transmitter armature 31a and to differential transformer armature 33a. The synchro receiver armature 32a follows the rotation of the armature 31a with a relative angular difference which is proportional to the viscosity of fluid 41. This relative angular difference between the synchro transmitter and receiver means is equal to the angular difference, between the field and the armature of the differential transformer 33, and is converted into a voltage across the output terminals of the secondary windings 33c, which voltage is proportional to the angular difference and hence to the viscosity of the fluid. By connection of the secondary output coil 33c to a controller means 38 the viscosity may be automatically controlled in this same manner, as previously described. Referring to FIGURE 3b, the connections between the field coils 31b and 32b are represented by the lines 32c.

It can be seen from the foregoing that the instant invention provides novel viscosity detection means capable of continuous operation and enabling viscosity measurements to be taken over an extremely wide range. Utilization of the viscosity measurement output enables control over the viscosity of the fluid medium being measured. The instant invention may be fabricated, utilizing relatively small synchronous motors, synchro transmitter and receiver means, current transformers and the like, which enable a precise viscosity detection to be continuously generated for providing a signal adaptable for a distant transmission, thereby providing a very practical and effective viscosity detection means.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Means for measuring the viscosity of a fluid comprising:
    a power source;
    synchro transmitter means having an armature coil rotating at a fixed angular velocity;
    synchro receiver means having an armature coil electrically connected in parallel to said synchro transmitter means armature coil and said power source to follow the rotation of said synchro transmitter means;
    said synchro transmitter and receiver means each having a field coil;
    a rotatable member coupled to said synchro receiver means and being immersed in a fluid medium;
    said rotatable member being driven by said synchro receiver means armature coil wherein the fluid medium loads said rotatable member and said synchro receiver means causing said synchro receiver means to lag said synchro transmitter means by an angle representative of the viscosity of the fluid medium.

2. The device of claim 1 further comprising control means having an armature and a field coil;
    said control means field coil being connected in parallel to said synchro transmitter and receiver field coils for generating a signal representative of the angular difference between said synchro transmitter and receiver means and hence representative of the viscosity of the fluid medium being measured.

3. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected in parallel; first means for driving said synchro transmitter means armature at a constant angular velocity; a rotatable member being immersed in a fluid medium and being connected to and driven by said receiver synchro means armature coil; a power source; said armature coils and said power source being connected in parallel; second means having a field coil connected in parallel to said transmitter and receiver synchro means field coils for generating a signal representative of the viscosity of the fluid medium being measured.

4. The device of claim 3, wherein said first means comprises a synchronous motor means connected to said power source for rotating said transmitter synchro means armature at a constant angular velocity.

5. The device of claim 4 wherein said second means is further comprised of an armature coil mechanically coupled to said synchronous motor means so as to be driven at a constant angular velocity.

6. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said first means comprising a synchronous motor means for rotating said transmitter synchro means armature at a constant angular velocity; said second means comprising synchro control transformer means having a field coil electrically connected to said transmitter and receiver synchro means field coils, and an armature coil mechanically linked to said synchronous motor means; said synchro control transformer armature generating a signal representative of the viscosity of the fluid medium.

7. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said first means comprising a synchronous motor means for rotating said transmitter synchro means armature at a constant angular velocity; said second means comprising synchro control transformer means having a field coil electrically connected to said transmitter and receiver synchro means field coils, and an armature coil mechanically linked to said synchronous motor means; said synchro control transformer armature generating a signal representative of the viscosity of the fluid medium; controller means connected to said synchro control transformer means for regulating the viscosity of the fluid medium.

8. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said second means comprising a power source; said synchro transmitter means and receiver means armature coils being electrically connected across said power source; a measurement circuit comprising load means having third means coupling said load means across said power source and fourth means connecting said load means in series with said power source to develop a signal across said load means representing the viscosity of the fluid medium.

9. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said second means comprising a power source; said synchro transmitter means and receiver means armature coils being electrically connected across said power source; a measurement circuit comprising load means having third means coupling said load means across said power source and fourth means connecting said load means in series with said power source to develop a signal across said load means representing the viscosity of the fluid medium; said third means being a first current transformer.

10. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said second means comprising a power source; said synchro transmitter means and receiver means armature coils being electrically connected across said power source; a measurement circuit comprising load means having third means coupling said load means across said power source and fourth means connecting said load means in series with said power source to develop a signal across said load means representing the viscosity of the fluid medium; said third means being a first current transformer; said fourth means being a second current transformer having characteristics identical with said first current transformer.

11. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said second means comprising a power source; said synchro transmitter means and receiver means armature coils being electrically connected across said power source; a measurement circuit comprising load means having third means coupling said load means across said power source and fourth means connecting said load means in series with said power source to develop a signal across said load means representing the viscosity of the fluid medium; said third means being a first current transformer; said fourth means being a second current transformer having characteristics identical with said first current transformer; phase correction means connected between said second current transformer and said load means for establishing an in-phase relationship with the output of said first current transformer.

12. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said second means comprising a power source; said synchro transmitter means and receiver means armature coils being electrically connected across said power source; a measurement circuit comprising load means having third means coupling said load means across said power source and fourth means connecting said load means in series with said power source to develop a signal across said load means representing the viscosity of the fluid medium; said third means being a first current transformer; said fourth means being a second current transformer having characteristics identical with said first current transformer; phase correction means connected between said second current transformer and said load means for establishing an opposite-phase relationship with the output of said first current transformer.

13. Means for measuring the viscosity of a fluid medium comprising synchro transmitter means and synchro receiver means; said synchro transmitter and receiver means each comprising a field coil and a rotatable armature coil; the field coils of said synchro transmitter means and said synchro receiver means being electrically connected; first means for driving said synchro transmitter means armature at a constant angular velocity; a rotatable member being immersed in a fluid medium and being connected to and driven by said receiver synchro means armature coil; second means connected to said transmitter and receiver synchro means field coils for generating a signal representative of the viscosity of the fluid medium being measured; said second means comprising a power source; said synchro transmitter means and receiver means armature coils being electrically connected across said power source; synchro control transformer means comprising a primary winding connected across said power source; a secondary winding and a rotatable armature mechanically coupled to said first means; said secondary winding generating a resultant signal representative of the viscosity of the fluid medium.

References Cited by the Examiner
UNITED STATES PATENTS

| | | | |
|---|---|---|---|
| 2,357,003 | 8/1944 | Hurndall | 73—59 |
| 2,485,424 | 10/1949 | Weisz | 73—59 |

DAVID SCHONBERG, Primary Examiner.